(12) United States Patent
Rajvanshy et al.

(10) Patent No.: US 8,380,931 B2
(45) Date of Patent: Feb. 19, 2013

(54) MEMORY CACHE DATA CENTER

(75) Inventors: Vikas Rajvanshy, Clyde Hill, WA (US); Bradley J. Barrows, Redmond, WA (US); Michael J. McCann, Kirkland, WA (US); Hasrat Godil, Bellevue, WA (US); Xinguang Chen, Bellevue, WA (US); Oludare V. Obasanjo, Renton, WA (US); Paul R. C. Ming, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 12/723,153

(22) Filed: Mar. 12, 2010

(65) Prior Publication Data

US 2011/0225367 A1 Sep. 15, 2011

(51) Int. Cl.
*G06F 12/08* (2006.01)
(52) U.S. Cl. ........ 711/118; 711/161; 711/162; 711/165; 714/6.23
(58) Field of Classification Search ............. 711/118, 711/162, 161, 165; 714/6.23
See application file for complete search history.

(56) References Cited

U.S. PATENT DOCUMENTS

| | | | |
|---|---|---|---|
| 6,314,491 B1 * | 11/2001 | Freerksen et al. | 711/124 |
| 6,842,869 B2 * | 1/2005 | Goodman | 714/43 |
| 2001/0039565 A1 | 11/2001 | Gupta | |
| 2003/0028729 A1 | 2/2003 | Yamamoto et al. | |
| 2003/0070063 A1 | 4/2003 | Boyle et al. | |
| 2003/0191916 A1 * | 10/2003 | McBrearty et al. | 711/162 |
| 2005/0102553 A1 * | 5/2005 | Cochran et al. | 714/6 |
| 2005/0188055 A1 | 8/2005 | Saletore | |
| 2005/0210152 A1 | 9/2005 | Hawes | |
| 2005/0216554 A1 | 9/2005 | Meiman et al. | |
| 2008/0082648 A1 * | 4/2008 | Ahmed et al. | 709/223 |
| 2009/0228647 A1 | 9/2009 | Klems et al. | |

FOREIGN PATENT DOCUMENTS

WO WO-2011112750 9/2011

OTHER PUBLICATIONS

"International Search Report", Mailed Date: Oct. 27, 2011, Application No. PCT/US2011/027791, Filed Date: Mar. 9, 2011, pp. 8.
"Microsoft Previews Velocity, a Distributed, In-Memory Cache", Jun. 11, 2008, Retrieved at <<http://www.artima.com/forums/flat.jsp?forum=270&thread=232670>>, pp. 4.
"ScaleOut StateServer", Jan. 8, 2010, Retrieved at <<http://www.sharewareconnection.com/scaleout-stateserver.htm>>, pp. 3.
Fitzpatrick, Brad., "Distributed Caching with Memcached", Jan. 8, 2010, Retrieved at <<http://www.linuxjournal.com/article/7451>>, pp. 11.
"Databases in the Cloud: Elysian Fields or Briar Patch?", Jan. 8, 2010, Retrieved at <<http://www.ddj.com/database/218900502?pgno=4>>, pp. 3.
Joubert, et al., "High-Performance Memory-Based Web Servers: Kernel and User-Space Performance", Jan. 8, 2010, Retrieved at <<http://74.125.155.132/scholar?q=cache:a2OVkyNbbVkJ:scholar.google.com/+%22in+memory%22+cache+server+farms&hl=en&as_sdt=2000 >>, pp. 13.

* cited by examiner

*Primary Examiner* — Jae Yu
(74) *Attorney, Agent, or Firm* — Wolfe-SBMC

(57) ABSTRACT

A data center system includes a memory cache coupled to a data center controller. The memory cache includes volatile memory and stores data that is persisted in a database in a different data center system that is located remotely from the data center system rather than in the first data center system. The data center controller reads data from the memory cache and writes data to the memory cache.

20 Claims, 6 Drawing Sheets

MEMORY CACHE DATA CENTER

BACKGROUND

Networked services are available that provide various functionality to users throughout the world. Given the large number of users that can access such services, large data centers can be built that include databases to store the information for the various users of these services. However, such large data centers are not without their problems. One such problem is that as the number of users increases it becomes difficult for a single data center to manage all of the users of a service. Another such problem is that some users can be located a long distance away from the data center, increasing network latency to such users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, data is maintained in a memory cache of a first data center, the memory cache including volatile memory. The data is persisted in a database in a second data center located remotely from the first data center. In response to a request for data received at the first data center, the requested data is retrieved from the memory cache and returned to the requester from which the request was received if the data is in the memory cache. If the data is not in the memory cache then the data is obtained from a different data center located remotely from the first data center, added to the memory cache, and returned to the requester. In response to a request received at the first data center to store additional data in the first data center, the additional data is stored in the memory cache after the additional data has been added to the database in the second data center.

In accordance with one or more aspects, a first data center system may include a memory cache coupled to a data center controller. The memory cache may include volatile memory and stores data that is persisted in a database in a second data center system rather than in the first data center system. This second data center system is located remotely from the first data center system. The data center controller reads data from the memory cache and writes data to the memory cache.

BRIEF DESCRIPTION OF THE DRAWINGS

The same numbers are used throughout the drawings to reference like features.

DETAILED DESCRIPTION

A memory cache data center is discussed herein. A service is made available to users across a wide geographic range using multiple data centers. One or more of these multiple data centers includes a database that is a persistent store of the various data maintained by the service. Additionally, one or more of these multiple data centers is a memory cache data center, which includes a memory cache storing at least some of the data maintained by the service. A memory cache data center, however, does not include a database for the service; rather, the memory cache data center communicates with another data center that includes a database to have data stored in the persistent store. Although a memory cache data center might include a database for other reasons, a memory cache data center in accordance with the techniques discussed herein does not include a database that is a persistent store of the various data maintained by the service. Furthermore, one or more of these multiple data centers can include both a database that is a persistent store of the data and a memory cache.

Figure 1:
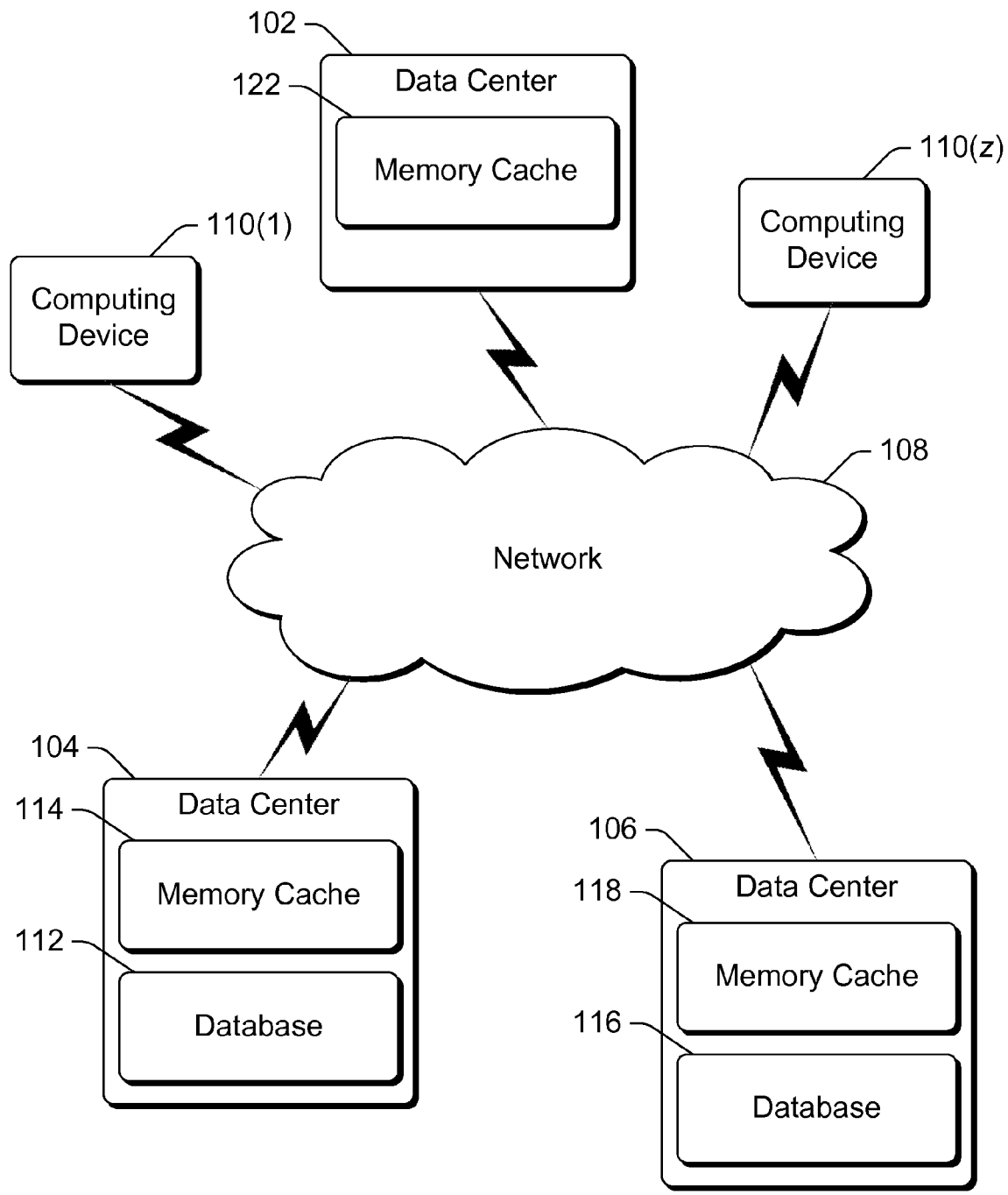
FIG. 1 illustrates an example system implementing the memory cache data center in accordance with one or more embodiments.

FIG. 1 illustrates an example system 100 implementing the memory cache data center in accordance with one or more embodiments. System 100 includes multiple data centers 102, 104, and 106 that can communicate with one another via a network 108. Network 108 can be a variety of different networks, including the Internet, a local area network (LAN), a cellular or other phone network, an intranet, other public and/or proprietary networks, combinations thereof, and so forth.

Data centers 102, 104, and 106 operate to provide a service to numerous (z) computing devices 110 across a wide geographic range. Computing devices 110 can be situated in various regions, countries, and continents throughout the world, and access data centers 102, 104, and 106 via network 108. Data centers 102, 104, and 106 are typically situated at different geographic locations, and each typically responds to requests from computing devices 110 that are geographically closest to the data center. Alternatively, data centers can respond to requests from computing devices 110 that are determined to be closest to the data center in manners other than geographic distance, such as determined based on network latency, based on network bandwidth, and so forth. Data centers 102, 104, and 106 can be accessed by a variety of different types of computing devices 110, such as a desktop computer, a laptop computer, a mobile station, an entertainment appliance, a television, a set-top box communicatively coupled to a display device, a cellular or other wireless phone, a game console, an automotive computer, and so forth.

Data centers 102, 104, and 106 can provide one or more of a variety of different services to computing devices 110. For example, data centers 102, 104, and 106 can provide one or more of a social networking service, an email service, a messaging service, an image and/or video sharing service, a gaming or other entertainment service, and so forth. Data centers 102, 104, and 106 maintain various data as part of providing the service. The particular data maintained can vary based on the particular service, such as account information for users, emails sent and/or received by users, images uploaded by users, and so forth.

Each data center 102, 104, and 106 includes one or more server computers that operate to provide one or more services. Similar to the discussion of computing devices 110 above, these server computers can be a variety of different types of computing devices. Each data center 102, 104, and 106 typically includes multiple server computers (e.g., on the order of tens, hundreds, or even more server computers). Data centers 102, 104, and 106 are also referred to as server farms. However, it should be noted that any number of data centers 102, 104, and 106 may include a small number of server computers (e.g., fewer than ten server computers).

Data center 104 includes a database 112 and memory cache 114, and data center 106 includes a database 116 and memory cache 118. Databases 112 and 116 are a persistent store of data and can be implemented using a variety of different database technologies including, for example, relational or non-relational databases, large-scale non-relational stores, and so forth. For example, databases 112 and 116 can be implemented using a Microsoft SQL Server® database, or the Microsoft Azure™ table service. Databases 112 and 116 are a persistent repository for the data maintained by the service provided by data centers 102, 104, and 106, and can be an authoritative repository for the data maintained by the service provided by data centers 102, 104, and 106. Different ones of databases 112 and 116 can store different data (e.g., data for different users), or alternatively can store at least some of the same data.

Memory caches 114 and 118 are caches of data stored in databases 112 and 116. Memory caches 114 and 118 are typically volatile storage devices (e.g., random access memory (RAM)) that are smaller than and store some data from databases 112 and 116. Memory caches 114 and 118 can typically be accessed more quickly than databases 112 and 116, and thus typically store data that has been more recently accessed or is otherwise deemed to be more likely to be accessed again in the near future (and thus can be accessed more quickly by data centers 104 and 106).

Data center 102, on the other hand, includes a memory cache 122. Memory cache 122 is similar to memory caches 114 and 118 in that memory cache 122 stores data that has been more recently accessed or is otherwise deemed to be more likely to be accessed again in the near future. However, data center 102 does not include a database that is a persistent repository for the data stored in data centers 102, 104, and 106. Rather than having a database local to data center 102, data center 102 communicates with a remote data center (one of data center 104 or 106) for the persistent storage of data. As a database is absent from data center 102, data center 102 is also referred to as a memory cache data center. It should be noted that a memory cache data center does not include a database that is a persistent repository for the data maintained by the service provided by data centers 102, 104, and 106, but could optionally include a database that maintains other data for other reasons.

System 100 is illustrated including two data centers 104 and 106 that include both memory caches and databases. However, system 100 can include any number of data centers that each include both a memory cache and a database. Similarly, a memory cache data center 102 is illustrated in system 100, although system 100 can include any number of memory cache data centers. Additionally, system 100 can include any number of data centers that include a database but no memory cache.

Figure 2:
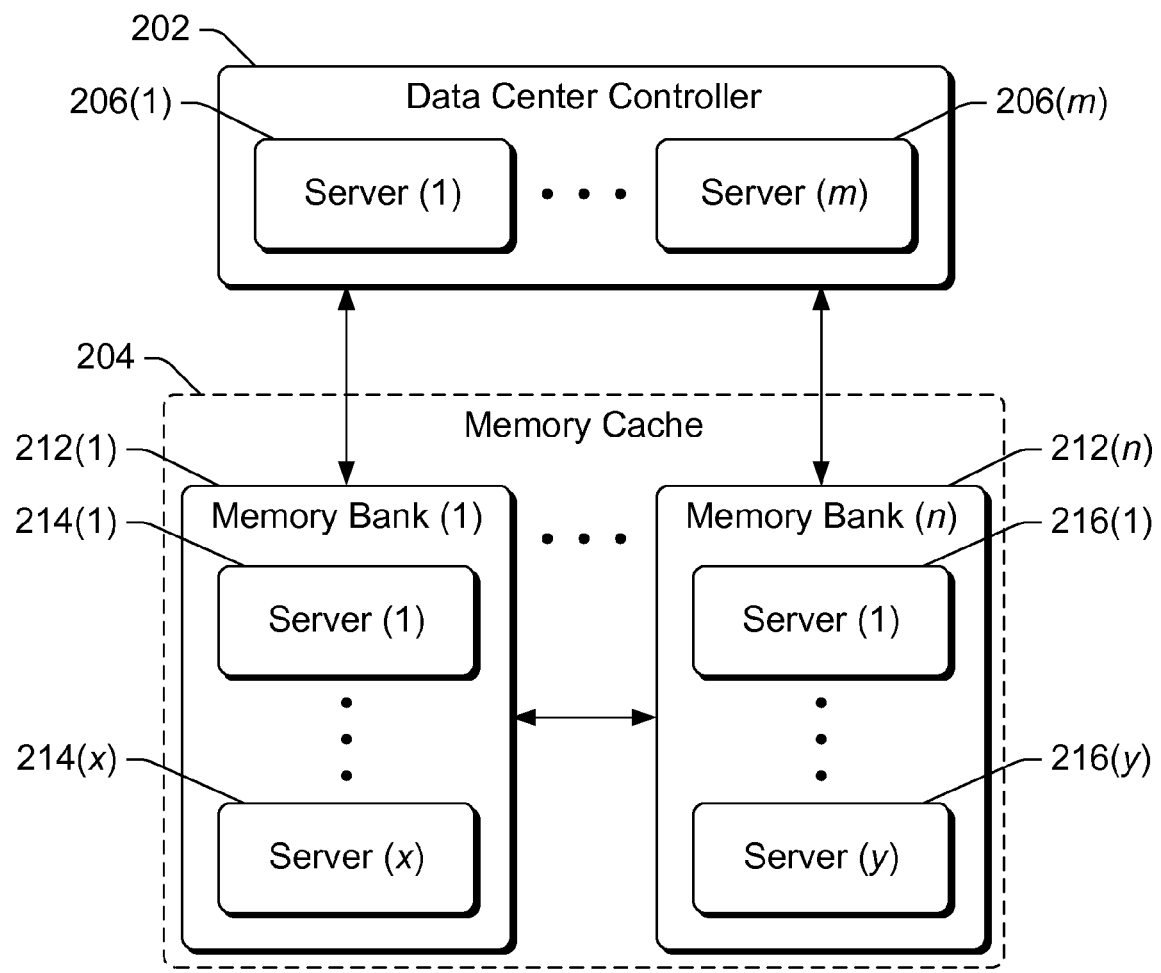
FIG. 2 illustrates an example memory cache data center in accordance with one or more embodiments.

FIG. 2 illustrates an example memory cache data center 200 in accordance with one or more embodiments. Data center 200 is an example of a data center that does not include a local database that is a persistent repository for the data maintained by the service provided by data centers (e.g., data center 102 of FIG. 1). Rather than including a local database, data stored in data center 200 is persisted in a database of a remote data center (e.g., one of data center 104 or 106 of FIG. 1). The absence of such a database in data center 200 reduces the cost of data center 200 by reducing the amount of hardware included in data center 200. Furthermore, the amount of communication among data centers can be reduced due to the absence of such a database in data center 200 because data center 200 does not add such a database that needs to be synchronized with other databases in other data centers.

Data center 200 includes a data center controller 202 and a memory cache 204. Data center controller 202 receives requests for data from computing devices, and in response to such requests retrieves and returns the requested data. This data can be retrieved from memory cache 204 or another data center as discussed in more detail below. Data center controller 202 also receives requests from computing devices to store data, and in response to such requests stores the received data in memory cache 204. The received data may also be communicated to another data center as discussed in more detail below. Data center controller 202 also performs additional operations in maintaining memory cache 204, such as backfilling data into various parts of memory cache 204 as discussed in more detail below.

It should be noted that data center 200 can be a data center including a large number (e.g., hundreds or thousands) of server computers, or alternatively a data center including a small number of server computers. A data center including a small number of server computers might not be typically thought of as a "data center", and could be, for example, a collection of multiple server computers that are coupled together via a variety of different network or coupling technologies, a collection of multiple server computers that are included in a small housing (e.g., storing 2-5 server computers) that can be coupled to a network, and so forth.

Data center controller 202 is implemented by multiple (m) server computers 206(1), . . . , 206(m). Although multiple server computers are illustrated in FIG. 2, alternatively data center controller 202 can be implemented by a single server computer. Each server computer can be a variety of different types of computing devices as discussed above.

Memory cache 204 includes two or more (n) memory banks 212(1), . . . , 212(n). Each memory bank 212 includes multiple server computers 214, 216. The particular server computer within a memory bank 212 on which particular data is stored can be determined by data center controller 202 or alternatively by a server computer of a memory bank 212. The particular server computer within a memory bank 212 on which particular data is stored can be determined in different manners, and can depend at least in part on the particular service provided by data center 200. For example, data associated with particular users can be stored on particular server computers, data associated with particular dates or categories can be stored on particular server computers, and so forth.

Different memory banks 212 can include the same number or alternatively different numbers of server computers. Each server computer 214, 216 typically includes both volatile storage media (such as RAM) and nonvolatile storage media (such as read only memory (ROM), Flash memory, optical disks, magnetic disks, and so forth). Various data and instructions for the operation of the server computer can be stored in volatile storage media and/or nonvolatile storage media. However, in one or more embodiments the data that is stored by data center 200 to provide the service of data center 200 is stored in volatile storage media.

Memory banks 212 operate as backup storage media for one another, storing duplicate copies of the same data. One or more server computers in a memory bank 212 can be powered down in response to a variety of events, such as due to a malfunction of the server computer, due to the installation of additional software, and so forth. As the data stored by data center 200 is stored in volatile storage media, when a server computer in a memory bank 212 is powered down the data stored on that server computer is lost. However, since a duplicate copy of the data is stored on the server computer of another memory bank 212, data center 200 still has the data stored. In one or more embodiments, the different memory banks 212 are expected to store duplicate copies of the same data. In alternate embodiments, different memory banks 212 can store a portion of the entire data set stored by memory cache 204. For example, if there are four memory banks 212, then each memory bank 212 may store only 75% of the entire data set stored by memory cache 204.

When a server computer of a memory bank 212 is restarted after having been powered down, the data that was previously stored on that server computer is again stored on that server computer. This restoring of the data on the server computer can automatically be performed in different manners. In one or more embodiments, data center controller 202 identifies that the server computer was previously powered down but has since been powered on and is currently running Data center controller 202 identifies the data that is to be stored on that server computer (e.g., the data for particular users), and directs the appropriate one or more server computers of another memory bank 212 to send that data to that server computer. Alternatively, the restoring of the data on the server can be performed in different manners, such as part of a proactive backfilling process as discussed in more detail below.

A backfilling process refers to copying data from one memory bank to another memory bank so that the same data is stored in each memory bank. The backfilling process can also refer to copying data to a memory bank from a database in the same data center as the memory bank, or alternatively from a database in a different data center as the memory bank. A proactive backfilling process refers to attempting to identify data that is not in a particular memory bank before that data is requested, rather than identifying that the data is not in the particular memory bank in response to the data being requested.

In one or more embodiments, data is stored in the volatile storage media of server computers 214, 216 in accordance with a particular fixed ordering. A variety of different fixed orderings can be used, such as storing data for users alphabetically by name, assigning a particular identifier (ID) to data (e.g., various data for a particular user) and storing data in ascending numerical order based on ID, and so forth.

Additionally, the data stored on server computers 214, 216 has an associated version number. This version number is assigned by, for example, data center controller 202 or a server computer 214, 216. The version number is incremented each time the data is updated, such as each time a user requests a change to his or her data.

Proactive backfilling is performed by comparing a set of IDs and version numbers from each of two memory banks 212 to identify any differences between the sets. As the data is typically stored on the server computers of the memory banks 212 in the same fixed orderings, the data in the sets can be compared sequentially to identify any differences between the sets. For example, a first set of 50 IDs and version numbers for data from a first memory bank 212 beginning at a particular location (e.g., the first storage location in a first server of the memory bank) can be obtained, and a second set of 50 IDs and version numbers for data from a second memory bank 212 beginning at a corresponding location can be obtained. If there are any IDs in the first set that are not in the second set, then the data for that ID is transferred from the first memory bank to the second memory bank, and vice versa. Similarly, if there are any version numbers in the first set that are larger (indicating a newer version of the data) than the version number of the corresponding identifier in the second set, then the data for that ID and version number is transferred from the first memory bank to the second memory bank, and vice versa. This obtaining and comparing of sets can be performed by data center controller 202, or alternatively by one or more server computers 214, 216.

Alternatively, proactive backfilling can be performed in different manners. For example, rather than comparing IDs and version numbers, the data can be compared (e.g., the data for the first 50 users beginning at a particular location). It should be noted that in situations where the data itself is compared, an ID and version number need not be maintained in memory banks 212. By way of another example, the data need not be stored in a fixed ordering. Rather, data from a first memory bank can be obtained and a second memory bank searched to determine whether that data from the first memory bank is present in the second memory bank.

The granularity at which data is read from and written to memory banks 212 can vary, and is managed by data center controller 202. For example, the various data for a particular user can be read from and written to memory banks 212 as a group. Accordingly, data for users is stored in the particular fixed ordering (e.g., alphabetically by name), and each set of 50 IDs and version numbers is the IDs and version numbers for the data of 50 different users. By way of another example, data can be read from and written to memory banks 212 grouped by a certain amount of data (e.g., 1 Megabyte). Accordingly, data for users is stored in the particular fixed ordering (e.g., numerically by an identifier assigned to each 1 Megabyte group of data), and each set of 50 IDs and version numbers is the IDs and version numbers for 50 different 1 Megabyte groups of data.

Figure 3:
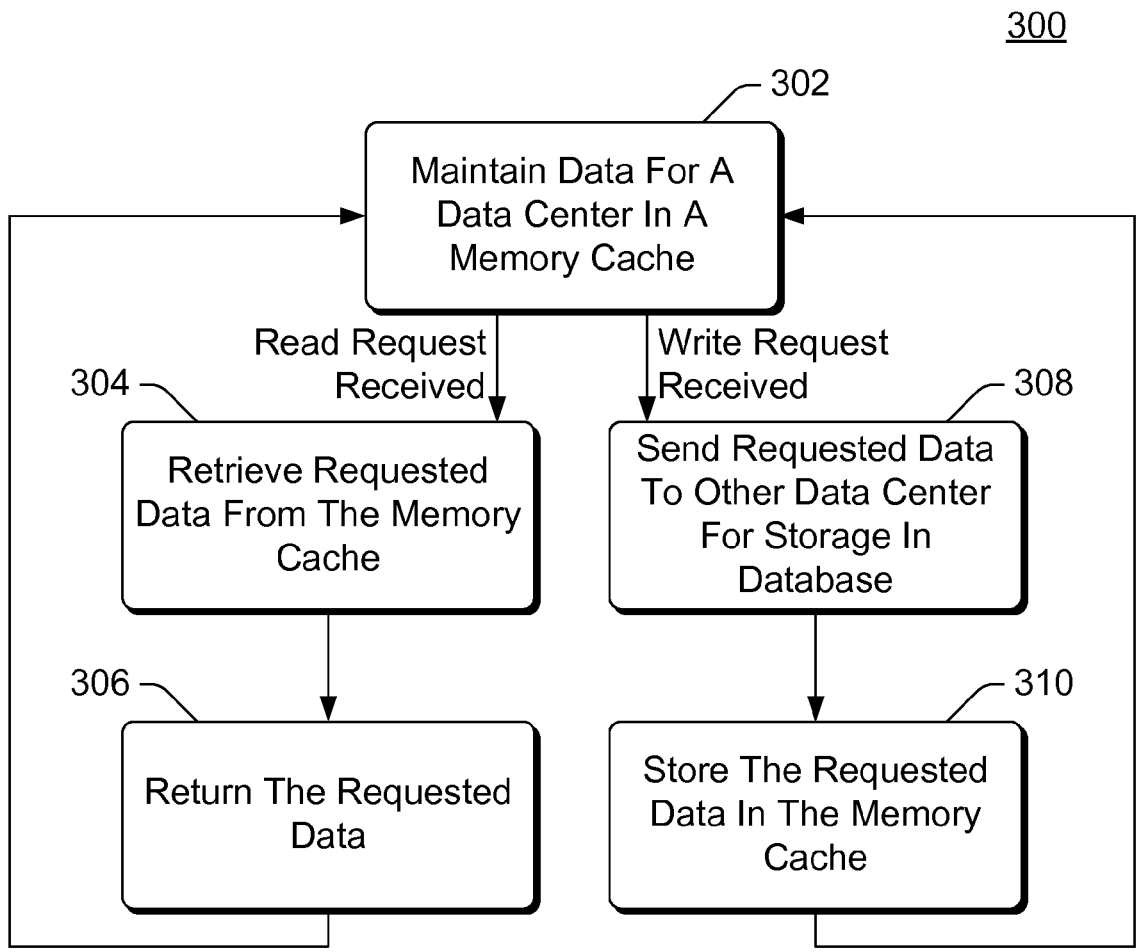
FIG. 3 is a flowchart illustrating an example process for operating a memory cache data center in accordance with one or more embodiments.

FIG. 3 is a flowchart illustrating an example process 300 for operating a memory cache data center in accordance with one or more embodiments. Process 300 is carried out by a memory cache data center, such as memory cache data center 200 of FIG. 2, and can be implemented in software, firmware, hardware, or combinations thereof. Process 300 is an example process for operating a memory cache data center; additional discussions of operating a memory cache data center are included herein with reference to different figures.

In process 300, data for a data center is maintained in a memory cache (act 302). The data center does not include a local database that is a persistent repository for the data maintained by the service provided by the data centers as discussed above, although data in the memory cache is persisted in another data center located remotely from the data center implementing process 300 as discussed above. This maintaining includes, for example, responding to requests to read data from the data center, responding to requests to write data to the data center, performing backfilling processes, and so forth.

A request to read data can be received at the data center. Generally, in response to a request to read data, the requested data is retrieved from the memory cache (act 304) and returned to the computing device from which the request was received (act 306). The data center responding to read requests is discussed in more detail below.

A request to write or store data can also be received at the data center. Generally, in response to a request to write or store data, the requested data is sent to another data center having a database that persists the data (act 308). After the data is persisted in the database, the data is stored in the memory cache (act 310). The data center responding to write requests is discussed in more detail below.

Returning to FIG. 2, data center 200 can receive a request for data from a requester. The requester is typically a computing device, such as the computing device of a user desiring to use the service provided by data center 200. Requests for data are received by data center controller 202, which in turn attempts to retrieve the requested data from memory cache 204. If the requested data is not stored in memory cache 204, then controller 202 accesses one or more other data centers to obtain the requested data. If obtained from another data center, controller 202 stores the obtained data in memory cache 204 and also returns the obtained data to the requester.

In situations where another data center is accessed to obtain the requested data, the other data center or data centers accessed can be identified in different manners. In one or more embodiments, data center controller 202 includes or accesses a record indicating which data center has a database that persists the particular data (e.g., based on IDs assigned to the data, based on a name of a user of the computing device requesting the data, etc.). The data center that includes the database that persists that particular data is the data center that is accessed. Alternatively, controller 202 can identify one or more other data centers in other manners, for example by selecting a data center that is closest (determined based on geographic distance or otherwise) to data center 200 (and if the data cannot be obtained from that data center, then continuing to select the next closest data center until the data is obtained or all data centers are selected). By way of another example, controller 202 can select data centers randomly, according to a pre-determined order configured into controller 202 (e.g., by a system administrator), according to some other rule or criteria, and so forth.

Alternatively, if the requested data is not stored in memory cache 204, then an indication of the requested data is placed in a queue. Data center controller 202 works through the queue (e.g., in a first-in, first-out (FIFO) order), obtaining the data identified in the queue from another data center and adding the data to memory cache 204. Thus, rather than obtaining the requested data from another data center and returning the obtained data to the requester, the requester can be informed that the data is temporarily unavailable. The data will subsequently be made available at some point in the future after the data has been obtained and added to memory cache 204.

In one or more embodiments, requests for data sent to another data center may be batched together so that a single combined request is sent to the other data center rather than multiple individual requests. Responses to the individual requests in the single combined request are generated by the other data center and also returned to data center 200 batched together as a single combined response. This batching together of individual requests and responses reduces the number of communications that are sent between data centers.

Whether multiple individual requests can be batched together by data center controller 202 can be determined in different manners. In one or more embodiments, when a request is to be sent to another data center, data center controller 202 waits for a particular amount of time (e.g., 100 milliseconds, 1 second, etc.) and batches all the requests (or alternatively all the requests up to a threshold amount) received during that particular amount of time into a single combined requests. In other embodiments other techniques are used, such as waiting until a threshold number of requests are to be sent to another data center. Analogous techniques can be used by the other data center in determining when to batch together responses to be returned to data center 200.

Figure 4:
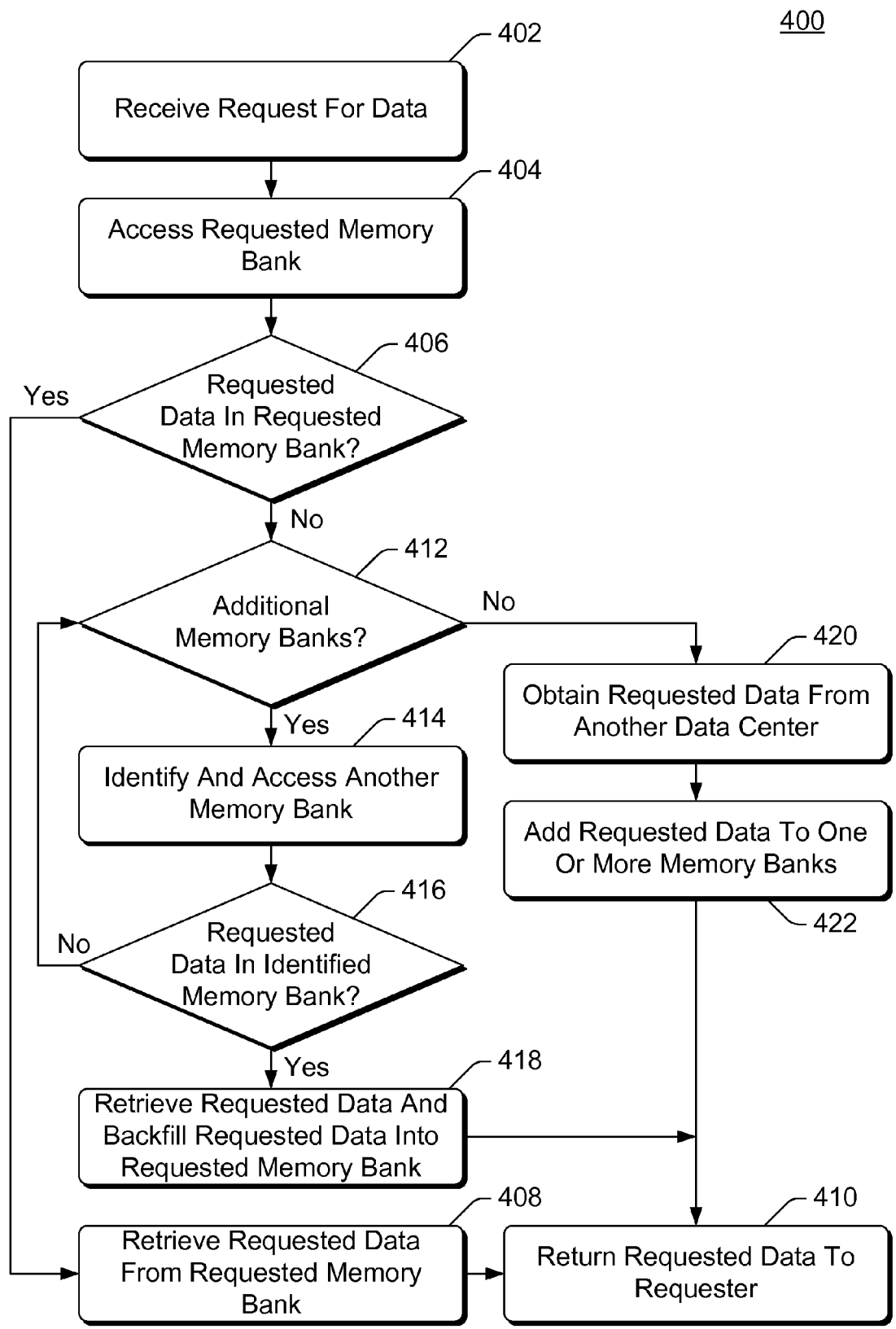
FIG. 4 is a flowchart illustrating an example process for reading data from a memory cache data center in accordance with one or more embodiments.

FIG. 4 is a flowchart illustrating an example process 400 for reading data from a memory cache data center in accordance with one or more embodiments. Process 400 is carried out by a data center, such as data center 200 of FIG. 2, and can be implemented in software, firmware, hardware, or combinations thereof. Process 400 is an example process for reading data from a memory cache data center; additional discussions of reading data from a memory cache data center are included herein with reference to different figures.

In process 400, a request for data is received from a requester (act 402). Associated with the request is a requested memory bank. The requester can identify the requested memory bank (e.g., having been previously notified by the data center of the memory bank in which the data is stored), or alternatively another component or device can identify the requested memory bank (e.g., a component of data center controller 202). In one or more embodiments, the requested memory bank is a default memory bank (e.g., in situations where no requested memory bank is identified by the requester or other component or device). It should be noted that the default memory bank can be the same for multiple requests, or alternatively can vary. If the default memory bank varies for different requests, the default memory bank for a particular request can be identified in different manners (e.g., selected randomly, selected following a round-robin process of going through the banks, selected according to other rules or criteria, and so forth).

The requested memory bank is accessed (act 404), and process 400 proceeds based on whether the requested data is stored in the requested memory bank (act 406). If the requested data is stored in the requested memory bank then the requested data is retrieved from the requested memory bank (408) and returned to the requester (act 410).

However, if the requested data is not stored in the requested memory bank, then a check is made as to whether there are additional memory banks that have not been checked for the requested data (act 412). If there are one or more memory banks that have not yet been checked for the requested data, then another such memory bank is identified and accessed (act 414). Another such memory bank can be identified in a variety of different manners, such as in a numerical order of memory bank identifiers (e.g., memory bank 1, followed by memory bank 2, followed by memory bank 3, etc.), based on random selection, according to some other rule or criteria, and so forth.

Process 400 proceeds based on whether the requested data is stored in the identified memory bank (act 416). If the requested data is not stored in the identified memory bank, then process 400 returns to check whether there are additional memory banks that have not been checked for the requested data (act 412).

However, if the requested data is stored in the identified memory bank then the requested data is retrieved from the identified memory bank and backfilled into the requested memory bank (act 418). Accordingly, the next time the data is requested, it is expected that the data will be in the requested memory bank. In addition to backfilling the requested data into the requested memory bank, the requested data is returned to the requester (act 410).

Returning to act 412, if there are no additional memory banks that have not been checked for the requested data, then the requested data is obtained from another data center (act 420). A request for the data is sent to the other data center, and in response the requested data is received from the other data center. This other data center from which the requested data is obtained can be a variety of other data centers as discussed above.

The requested data obtained from another data center is added to one or more memory banks (act 422), and is also returned to the requester (act 410). In act 422, the requested data can be added to one memory bank (e.g., the requested memory bank), and the proactive backfilling relied on to copy the data to the other memory banks Alternatively, the requested data can be added to multiple memory banks in act 422.

Process 400 discusses checking memory banks in acts 406 and 412, resulting in all of the memory banks being checked before the requested data is obtained from another data center. Alternatively, the requested data can be obtained from another data center without having checked all of the memory banks. If the requested data is not in the memory banks that are checked, then process 400 proceeds to act 420 to obtain the requested data from another data center. For example, a threshold number of the memory banks may be checked, such as a fixed number of the memory banks (e.g., three of the memory banks), or a relative number of the memory banks (e.g., 75% of the memory banks) By way of another example, another mechanism or technique could be used to determine that the memory banks most likely do not include the requested data after checking at least a threshold number (a fixed or variable number) of the memory banks.

It should be noted that situations can arise where the requested data is not available in a memory bank and is not available from another data center. In such situations, an indication that the requested data is not available is returned to the requester. Alternatively, depending on the nature of the data, the requested data could optionally be generated or created by the memory cache data center.

Returning to FIG. 2, data center 200 can also receive a request to store data from a requester. Requests to store data are received by data center controller 202, which in turn stores the data in memory cache 204. Controller 202 also communicates the data to another data center that includes a database that persists that data. The data center to which controller 202 communicates the data can be identified in a variety of different manners, analogous to the manner in which the data center from which data is to be read is identified as discussed above. The data communicated to the other data center can be communicated on an individual request basis (e.g., a separate communication may be sent by controller 202 for each request to store data), or alternatively data from multiple requests to store data can be batched together and sent to the other data center as a single combined storage request analogous to the discussion above regarding batching requests for data.

Figure 5:
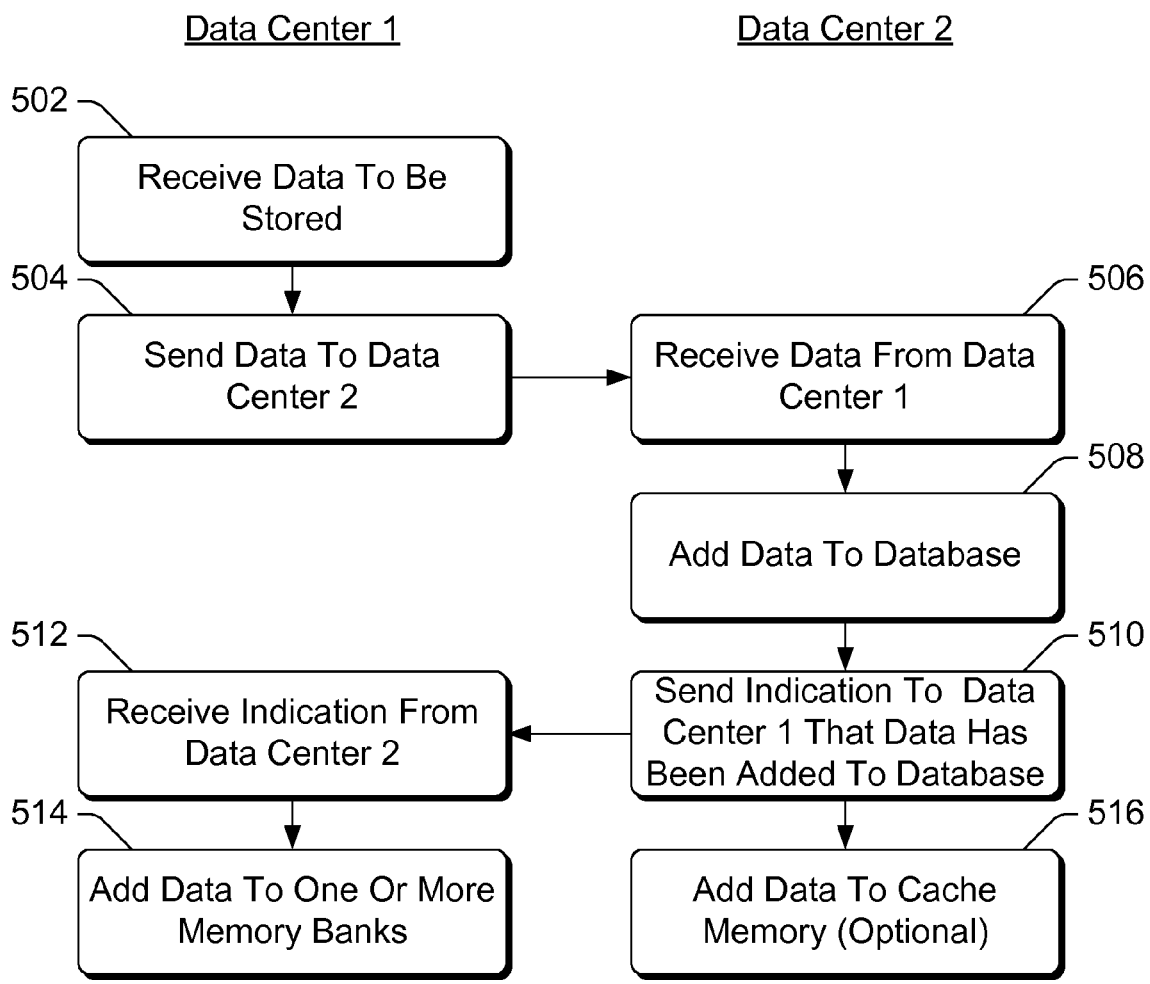
FIG. 5 is a flowchart illustrating an example process for writing data to a memory cache data center in accordance with one or more embodiments.

FIG. 5 is a flowchart illustrating an example process 500 for writing data to a memory cache data center in accordance with one or more embodiments. Process 500 can be implemented in software, firmware, hardware, or combinations thereof. Acts of process 500 illustrated on the left-hand side of FIG. 5 are carried out by a first data center (data center 1), such as data center 200 of FIG. 2 or data center 102 of FIG. 1. Acts of process 500 illustrated on the right-hand side of FIG. 5 are carried out by a second data center (data center 2), such as data center 104 or 106 of FIG. 1. Process 500 is an example process for writing data to a memory cache data center; additional discussions of writing data to a memory cache data center are included herein with reference to different figures.

In process 500, data to be stored is received (act 502). The data is received as part of a write request. The received data can be new data, such as data for a new user. Alternatively, the received data can be a change to existing data, such as changing data regarding a particular user that is already stored in the memory cache.

The received data is sent to the second data center (act 504). As discussed above, the first data center is a memory cache data center, so in act 504 the received data is sent to another data center that has a database that persists the data.

The second data center receives the data (act 506) and adds the data to the database of the second data center (act 508). After the data is added to the database of the second data center, the second data center sends an indication to the first data center that the data has been added to the database of the second data center (act 510).

The first data center receives the indication (act 512), and adds the received data (from act 502) to one or more memory banks of the memory cache (act 514). If the received data is new data, then this new data is added to the memory cache. If the received data is a change to existing data, then this received data can be added to the memory cache and the previous data invalidated or deleted, or alternatively this received data can overwrite the previous data.

In act 514, the received data can be added to one memory bank (e.g., a default memory bank), and the proactive backfilling relied on to copy the data to the other memory banks. Alternatively, the received data can be added to multiple memory banks in act 514.

The indication sent by the second data center in act 510 can take a variety of different forms. In one or more embodiments, the indication sent in act 510 is the data received in act 502. In such embodiments, the first data center need not keep track of the data received in act 502, but can simply forward the received data to the second data center and then add the data received from the second data center to one or more memory banks in response to receiving the data from the second data center in act 512. In other embodiments, the indication sent in act 510 is an identifier of particular data. For example, the first data center can temporarily store the data received in act 502 and provide an identifier of this temporarily stored data to the second data center in act 504 along with the data. The indication sent by the second data center in act 510 is this identifier of the temporarily stored data. In response to receiving the identifier of the temporarily stored data in act 512, the first data center can add the temporarily stored data to one or more memory banks in act 514 without the second data center having sent the data in act 510.

The second data center can also optionally add the data to the memory cache of the second data center (act 516). The data is added to the memory cache of the second data center typically only in situations in which the existing data being changed by the request was already stored in the memory cache of the second data center.

Returning to FIG. 2, in one or more embodiments one or more memory banks 212 is nonvolatile disk storage media rather than volatile storage media. A variety of different types of disks and disk drives can be used as the nonvolatile disk storage media, such as magnetic hard disk drives, optical disks and drives, and so forth. Nonvolatile disk storage media can cost less than volatile storage media, so using a memory bank of nonvolatile disk storage media can be a cost-effective technique for storing data in memory cache 204.

It should be noted that a memory bank 212 that is a nonvolatile disk storage media is different from a database. There is no database application managing the storage of data to and retrieval of data from the nonvolatile disk storage media memory bank 212. Rather, the same data as would be stored in a volatile storage media memory bank 212 is stored in the nonvolatile disk storage media memory bank 212, and such data is stored in the same order or arrangement on the storage media regardless of whether it is a volatile or nonvolatile storage media.

Having a nonvolatile disk storage media memory bank 212 facilitates backfilling of a volatile storage media in the event that a memory bank 212 is powered down and the data in the volatile storage media is lost. In such situations, when a memory bank 212 is powered on again, the volatile storage media can be backfilled from the nonvolatile disk storage media rather than obtaining the data from another data center with a database that includes the data. For example, assume that multiple server computers 214, 216 are powered off at approximately the same time, and further assume that the server computers 214, 216 storing duplicate copies of particular data are ones that are powered off. When these servers are powered back on, the particular data stored in the volatile storage media has been lost and can be backfilled from the nonvolatile disk storage media (if the server with the nonvolatile disk storage media was not powered off, or when the server with the nonvolatile disk storage media is powered back on). Thus, the data that was lost due to the powering off of the server computers 214, 216 can be backfilled from the nonvolatile disk storage media rather than being obtained from another data center. The copying of data from the nonvolatile disk storage media is typically faster than obtaining the data from another data center, and also reduces the number of requests and amount of data that is transferred between data centers.

It should be noted that situations can arise where data for which storage is requested by a computing device is received at a memory bank 212 while data is being copied to the memory bank 212 from the nonvolatile disk storage media. In such situations, the memory bank 212 maintains an update record which includes the received storage request. After the data has been copied to the memory bank 212 from the nonvolatile disk storage media, the storage requests included in the update record are written to the memory bank 212.

For some nonvolatile disk storage media, the time to access the storage media (including reading data from and writing data to the storage media) is significantly slower than the time to access volatile storage media. Accordingly, in such situations attempts are made to retrieve data from the volatile storage media memory bank or banks prior to attempting to retrieve data from the nonvolatile disk storage media. Additionally, in such situations the nonvolatile disk storage media memory bank may be configured to improve the time to access the storage media in memory cache 204. The nonvolatile disk storage media memory bank may be configured to improve the time to access the storage media in part by storing data in the nonvolatile disk storage media sequentially. For example, data for a particular user is stored so that the data can be read sequentially from the nonvolatile disk storage media without incurring the seek time loss of finding one or more randomly stored parts of the data.

In one or more embodiments, as data is written to the nonvolatile disk storage media memory bank, a log of changes to the nonvolatile disk storage media is maintained in volatile memory. When the log meets or exceeds a threshold size (e.g., a threshold number of bytes, a threshold number of writes, data for a threshold number of users, etc.), the data in the log is written to the nonvolatile disk storage media. Alternatively, the data in the log can be written to the nonvolatile disk storage media in response to other events or thresholds, such as when data has been in the log for at least a threshold amount of time. When the log is written to the nonvolatile disk storage media, the log is written so that the data is written on the nonvolatile disk storage media sequentially. Writing the data on the nonvolatile disk storage media sequentially refers to writing the data so that the data can be read from the storage media without having to seek to new, random locations of the storage media to read particular parts of the data. For example, the data can be located in close physical proximity on the storage media. The specific manner in which the data is written on the nonvolatile disk storage media sequentially can vary based on the particular design of the nonvolatile disk storage media.

Writing the log to the nonvolatile disk storage media can include writing just the data from the log to the nonvolatile disk storage media, and can also include reading data from the nonvolatile disk storage media that is combined with data in the log and then written to the nonvolatile disk storage media. For example, additional data for a user may be included in the log. Just this additional data can be written to the nonvolatile disk storage media if there is sufficient space in an area of the nonvolatile disk storage media to write the additional data and still have the data for the user stored sequentially on the nonvolatile disk storage media. If there is not such sufficient space, then the data for the user can be read from the nonvolatile disk storage media, the data from the log added thereto, and this new data for the user (including the additional data from the log) can be written to the nonvolatile disk storage media sequentially.

Additionally, each entry in the log can have an associated timestamp (e.g., indicating when the entry was added to the log, indicating when the change was received by data center controller 202, etc.). A snapshot of a volatile storage media memory bank that stores duplicate copies of the data in the nonvolatile disk storage media memory bank can be taken at various regular or irregular intervals (e.g., approximately hourly). This snapshot is a copy of the volatile storage media memory bank, and is written to the nonvolatile disk storage media. Any entries in the log having an associated timestamp that is later than the time at which the snapshot is taken are deleted from the log (such entries do not need to be written to the nonvolatile disk storage media because they will have already been written to the nonvolatile disk storage media as part of writing the snapshot to the nonvolatile disk storage media).

In situations where the data is stored on the nonvolatile disk storage media sequentially, data that is grouped together is read or written sequentially to the nonvolatile disk storage media, and the data can be grouped together in various manners. For example, data for a particular user can be grouped together. By way of another example, the data on the nonvolatile disk storage media can be grouped together into groups referred to as buckets, and each bucket can include data for one or more users (e.g., a bucket can be 200 Megabytes).

It should be noted that situations can arise where the time to access the nonvolatile disk storage media is approximately the same as the time to access volatile storage media. Such situations can arise, for example, where the nonvolatile disk storage media is a solid state drive (e.g., a Flash memory drive). In such situations, the nonvolatile disk storage media can be treated as if it were a volatile storage media. For example, attempts to retrieve data from volatile storage media need not be made before attempts are made to retrieve data from the nonvolatile disk storage media, and the nonvolatile disk storage media need not be configured to improve the time to access the storage media.

In one or more embodiments, the data stored in memory cache 204 has an associated expiration time or time to live (TTL). The granularity of data with which the expiration time is associated can vary. For example, data for different users can have separate associated expiration times, individual pieces of data (e.g., email address, current photos, etc.) for a user can have separate associated expiration times, data in larger amounts (e.g., 200 Megabyte chunks) can have separate associated expiration times, and so forth. When a request for data is received and the expiration time associated with the requested data has passed (also referred to as the data being stale), the requested data may be returned to the requester even though the data is stale. Additionally, a new copy of the requested data (that is not stale) may be obtained from another data center or another memory bank, so subsequent requests for the requested data will be responded to with the data that is not stale.

Data center 200 can receive, in addition to data that data center 200 has requested, additional data from other data centers. This is also referred to as data being pushed to data center 200 from other data centers. Data can be pushed to data center 200 from other data centers for a variety of different reasons, such as when a change to the data occurs at the other data center.

This pushing of data to data center 200, as well as to other data centers, allows updates that occur to a database to be stored in the various memory caches regardless of the data centers in which those memory caches are located. In response to data being written to a database at a data center, that data center notifies the various other data centers of the update to the database so that the memory caches in the various other data centers (including data center 200) can include the update. This data written to the database can be a change to previously stored data (e.g., data previously stored for a particular user) or other new data for which previous versions have not been stored (e.g., data for a new user). Changes to the database are thus synchronized with the various memory caches in the various data centers.

Various techniques are discussed herein regarding managing the storing of multiple copies of data on multiple memory banks and/or in multiple data centers. Generally, such replicating of data between different stores (whether those stores are memory banks or data centers) can be performed in a variety of different manners and can be performed using a variety of different synchronization or replication techniques or processes.

In one or more embodiments, when data is pushed to data center 200, data center controller 202 checks whether a previous version of the received data is already stored in memory cache 204. For example, new or changed data for a particular user can be pushed to data center 200, in response to which data center controller 202 checks whether data for that particular user is already stored in memory cache 204. If a previous version of the received data is already stored in memory cache 204, then controller 202 updates the received data in memory cache 204. This updating typically does not (although alternatively could) affect how recently used that data is in memory cache 204, so the data is not reflected as having been more recently used in memory cache 204 simply due to the data being pushed to data center 200. However, if a previous version of the received data is not already stored in memory cache 204, then controller 202 does not store the received data in memory cache 204, and ignores or discards the received data. If a previous version of the received data was not already stored in memory cache 204, then controller 202 assumes that requests for that data have not been recently received by data center 200, so controller 202 need not keep the data in memory cache 204.

It should also be noted that situations can arise where a request to store data in memory cache 204 is received but there is insufficient storage space in memory cache 204 for the data. In such situations, a portion of memory cache 204 may be deleted in order to make room for the newly received data. The portion of memory cache 204 that is deleted can be identified in a variety of different manners, such as by identifying a least recently used (LRU) portion of memory cache 204, by identifying a stale portion of memory cache 204, and so forth. The granularity of data that is a portion that is deleted can vary. For example, recent access information for data for different users can be maintained and a portion can be the data for a particular user. By way of another example, recent access information for a particular amount of data (e.g., 200 Megabyte chunks) can be maintained and a portion can be this particular amount of data. If, after data is deleted from memory cache 204, a request is received for the deleted data, the deleted data is obtained from another data center.

Additionally, various techniques can be used by data center 200 as well as the other data centers with which data center 200 communicates to reduce the amount of data transferred and/or bandwidth consumed in transferring data between data centers. One such technique is to employ a compression algorithm to compress the data being communicated, thereby reducing the amount of data transferred. Another technique that is employed in one or more embodiments is to identify particular pieces of data that are needed by the other data center and only transferring those particular pieces. These particular pieces are, for example, newly added pieces of data or pieces of data that have changed. For example, assume that data regarding different users is maintained by the data centers for a social networking service, and this data includes the user's name, email address, favorite photos, and so forth. If the user's email address is changed, then only this piece of data (the new email address) and an indication of what the piece of data is need be transferred to the other data center. The other pieces of data (e.g., favorite photos) need not be transferred as no changes to that data occurred. Controllers at the data centers (e.g., data center controller 202) are configured with or otherwise have knowledge of the manner in which data is stored in memory caches (e.g., memory cache 204). Accordingly, the controllers can readily transfer particular pieces of data along with an indication of the particular piece of data, and the receiving controller can readily add that particular piece of data to the memory cache.

The memory cache data center techniques discussed herein also facilitates management of the server computers in data center 200. The memory cache data center techniques can facilitate such management by, for example, allowing data center 200 to continue operation when one or more server computers are powered off, and automatically copying data to the appropriate server computers (e.g., backfilling) when they are powered back on. For example, one or more server computers can be powered off at various times in order to fix broken server computers, replace server computers, install new software or software upgrades on server computers, and so forth. Data center 200 is resilient and able to accommodate such situations, copying data to the server computers after they are powered back on as discussed above.

Additionally, it should be noted that the data stored in memory cache 204 is typically not expected to be exactly the same data that is stored in the memory caches of other data centers (e.g., data centers 104 and 106 of FIG. 1). It is expected that data center 200 receives and handles requests for data from a particular group of computing devices, such as computing devices that are close to (determined based on geographic distance or otherwise) data center 200. Similarly, other data centers are expected to receive and handle requests for data from a different group of computing devices, such as computing devices that are close to (determined based on geographic distance or otherwise) those other data centers. As users of different computing devices are expected to have and request access to different data, it is expected that the data stored in memory cache 204 is different from the data stored in memory caches of other data centers.

Additionally, it is discussed above that when a request to store data is received at data center controller 202, the data is stored in memory cache 204 and is also sent to a data center having a database that persists the data. Alternatively, situations can arise where data is not sent to such a data center having a database that persists the data. Data center controller 202 is configured with, or otherwise identifies, information indicating data that does not need to be sent to such a data center having a database. In one or more embodiments a variety of different types of data need not be sent to such a data center having a database, such as data that is changed frequently (e.g., requests to store the data are received at greater than a particular threshold), data that can be easily re-calculated if lost (e.g., re-calculated based on data already stored in the database), and so forth.

Thus, the memory cache data center discussed herein allows data centers each including numerous server computers to work in combination with one another to provide services to computing devices located across a wide geographic range. Databases that are a persistent repository for the data maintained by the service provided by the data centers are absent from the memory cache data centers, which reduces both the cost of the memory cache data centers and the amount of data that is communicated between data centers (because the memory cache data centers do not include databases that need to be kept in synchronization with databases of other data centers).

Discussions are made herein referring to memory caches and databases being included within data centers that can be spread out across a wide geographic range. It is to be appreciated, however, that the techniques discussed herein can also be applied to other systems. For example, rather than different data center systems, the techniques discussed herein can be used with different racks within a data center. Some racks can include server computers with memory caches and databases that are a persistent repository for the data maintained by the service provided by the racks, other racks can include server computers with memory caches but no databases that are a persistent repository for the data maintained by the service provided by the racks, and still other racks can include server computers with databases that are a persistent repository for the data maintained by the service provided by the racks but no memory caches. By way of another example, rather than different data center systems, the techniques discussed herein can be used within different clusters of server computers within a data center. Some clusters can include server computers with memory caches and databases that are a persistent repository for the data maintained by the service provided by the clusters, other clusters can include server computers with memory caches but no databases that are a persistent repository for the data maintained by the service provided by the clusters, and still other clusters can include server computers with databases that are a persistent repository for the data maintained by the service provided by the clusters but no memory caches.

Figure 6:
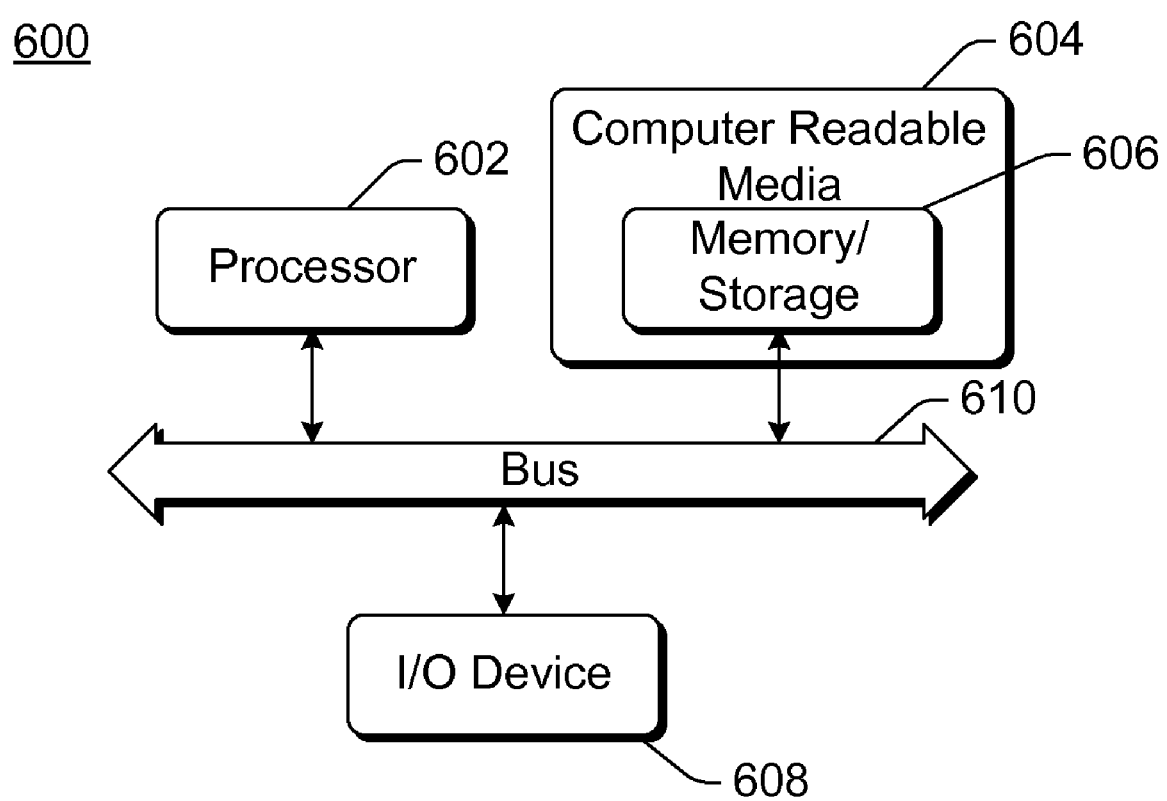
FIG. 6 illustrates an example computing device that can be configured to implement aspects of the memory cache data center in accordance with one or more embodiments.

FIG. 6 illustrates an example computing device 600 that can be configured to implement aspects of the memory cache data center in accordance with one or more embodiments. Computing device 600 can be used to implement, for example, part of data center 102, data center 104, or data center 106 of FIG. 1, or can be a server computer 206, 214, or 216 of FIG. 2.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software. Generally, software includes routines, programs, objects, components, data structures, and so forth that perform particular tasks or implement particular abstract data types. An implementation of these techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the operations or techniques described herein can be implemented using software, firmware, hardware (e.g., fixed logic circuitry), manual processing, or a combination of these implementations. In the case of a software implementation, the operations or techniques are implemented using program code that performs specified tasks when executed on a processor (e.g., CPU or CPUs). The program code can be stored in one or more computer readable memory devices, further description of which may be found with reference to FIG. 6. The features of the memory cache data center techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a first data center, the method comprising:
    maintaining data in a memory cache of the first data center that is a memory cache data center, wherein the data is persisted in a database in a second data center located remotely from the first data center, and wherein the memory cache includes volatile memory;
    retrieving, in response to a request for data received at the first data center, the requested data from the memory cache if the requested data is in the memory cache, and otherwise obtaining the requested data from a different data center located remotely from the first data center and adding the requested data to the memory cache;
    returning the requested data to a requester from which the request was received;
    storing, in response to a request received at the first data center to store additional data in the first data center, the additional data in the memory cache;
    batching together the additional data along with data from multiple additional requests to store further additional data into a single combined storage request, and sending the single combined storage request to the second data center; and
    the storing comprising storing the additional data in the memory cache after the additional data has been added to the database in the second data center.

2. A method as recited in claim 1, wherein maintaining the data comprises maintaining the data in the absence of a database persisting the data in the first data center.

3. A method as recited in claim 1, wherein the memory cache includes multiple memory banks, and wherein the maintaining comprises storing a copy of the data in each of the multiple memory banks.

4. A method as recited in claim 3, wherein a first memory bank of the multiple memory banks comprises volatile memory, and a second memory bank of the multiple memory banks comprises one or more disk drives.

5. A method as recited in claim 4, wherein the one or more disk drives comprise one or more solid state drives.

6. A method as recited in claim 4, further comprising storing the additional data and the further additional data in a log in volatile memory, then subsequently writing the data in the log to the one or more disk drives sequentially.

7. A method as recited in claim 4, wherein retrieving the requested data from the memory cache comprises attempting to retrieve the requested data from the first memory bank prior to attempting to retrieve the requested data from the second memory bank.

8. A method as recited in claim 3, wherein each of the multiple memory banks includes different ones of multiple server computers.

9. A method as recited in claim 3, wherein retrieving the requested data comprises:
    accessing a first memory bank of the multiple memory banks to retrieve the requested data;
    if the requested data is in the first memory bank, then retrieving the requested data from the first memory bank; and
    if the requested data is not in the first memory bank, then retrieving the requested data from a second memory bank of the multiple memory banks and adding the requested data to the first memory bank.

10. A method as recited in claim 3, wherein maintaining the data in the memory cache includes:
    comparing a first set of data in a first memory bank of the multiple memory banks to a second set of data in a second memory bank of the multiple memory banks;
    copying data in the first set of data that is not in the second set of data to the second memory bank; and
    copying data in the second set of data that is not in the first set of data to the first memory bank.

11. A method as recited in claim 1, wherein the different data center is the second data center, and wherein obtaining the requested data from the different data center comprises obtaining the requested data from the database of the second data center.

12. A method as recited in claim 1, further comprising:
    receiving new data from the second data center;
    checking whether a previous version of the received new data is already stored in the memory cache; and
    storing the received new data in the memory cache only if a previous version of the received new data is already stored in the memory cache.

13. A method as recited in claim 12, wherein the new data is received from the second data center in response to an update to data stored in the database in the second data center.

14. A first memory cache data center system comprising:
    multiple memory banks, wherein each of the multiple memory banks includes one or more server computers that are part of a memory cache for the first memory cache data center system, wherein the memory cache stores multiple copies of data and each of the multiple memory banks stores one copy of the multiple copies of data, and wherein the memory cache includes volatile memory; and
    a data center controller coupled to the multiple memory banks, wherein the data center controller maintains, in the absence of a database in the first memory cache data center system, data in the first memory cache data center system, wherein the data center controller is configured to:
        receive, from a first requester, a request for data, retrieve the requested data from one of the multiple memory banks if the requested data is present in the multiple memory banks, obtain, if the requested data is not present in the multiple memory banks, the requested data from a second data center system located geographically remotely from the first memory cache data center system, return the requested data to the first requester, receive, from a second requester, a request to store additional data, send the additional data to the second data center system for storage in a database of the second data center system, and store the additional data in the multiple memory banks after the additional data has been stored in the database of the second data center system.

15. A method implemented in a first data center, the method comprising:

maintaining data in a memory cache of the first data center that is a memory cache data center, wherein the data is persisted in a database in a second data center located remotely from the first data center, the memory cache including multiple memory banks, a first of the multiple memory banks comprising volatile memory and a second of the multiple memory banks comprising one or more disk drives, and the maintaining comprising storing a copy of the data in each of the multiple memory banks;

retrieving, in response to a request for data received at the first data center, the requested data from the memory cache if the requested data is in the memory cache, and otherwise obtaining the requested data from a different data center located remotely from the first data center and adding the requested data to the memory cache, the retrieving the requested data from the memory cache comprising attempting to retrieve the requested data from the first of the multiple memory banks prior to attempting to retrieve the requested data from the second of the multiple memory banks;

returning the requested data to a requester from which the request was received; and storing, in response to a request received at the first data center to store additional data in the first data center, the additional data in the memory cache after the additional data has been added to the database in the second data center.

16. A method as recited in claim 15, the retrieving the requested data comprising:

accessing the first of the multiple memory bank to retrieve the requested data;

if the requested data is in the first of the multiple memory banks, then retrieving the requested data from the first of the multiple memory banks; and if the requested data is not in the first of the multiple memory banks, then retrieving the requested data from the second of the multiple memory banks and adding the requested data to the first of the multiple memory banks.

17. A method as recited in claim 15, wherein maintaining the data in the memory cache includes:

comparing a first set of data in the first of the multiple memory banks to a second set of data in the second of the multiple memory banks;

copying data in the first set of data that is not in the second set of data to the second of the multiple memory banks; and copying data in the second set of data that is not in the first set of data to the first of the multiple memory banks.

18. A method as recited in claim 15, further comprising:

receiving new data from the second data center;

checking whether a previous version of the received new data is already stored in the memory cache; and storing the received new data in the memory cache only if a previous version of the received new data is already stored in the memory cache.

19. A method as recited in claim 15, wherein maintaining the data comprises maintaining the data in the absence of a database persisting the data in the first data center.

20. A method as recited in claim 15, wherein each of the multiple memory banks includes different ones of multiple server computers.

* * * * *